United States Patent
Charpentier

(10) Patent No.: US 6,968,936 B2
(45) Date of Patent: Nov. 29, 2005

(54) SYSTEM FOR SUPPLYING PREFORMS IN PARTICULAR FOR A CONTAINER BLOWING MACHINE

(75) Inventor: Alain Charpentier, Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 0 days.

(21) Appl. No.: 10/399,148

(22) PCT Filed: Oct. 30, 2001

(86) PCT No.: PCT/FR01/03363

§ 371 (c)(1),
(2), (4) Date: Jul. 29, 2003

(87) PCT Pub. No.: WO02/36466

PCT Pub. Date: May 10, 2002

(65) Prior Publication Data

US 2004/0109747 A1 Jun. 10, 2004

(30) Foreign Application Priority Data

Nov. 3, 2000 (FR) .......................................... 00 14151

(51) Int. Cl.⁷ .............................................. B65G 47/24
(52) U.S. Cl. ...................................... 198/389; 198/396
(58) Field of Search ................................. 198/389, 396, 198/398, 453–455; 209/707

(56) References Cited

U.S. PATENT DOCUMENTS

| | | | | |
|---|---|---|---|---|
| 2,252,498 A | * | 8/1941 | Flaws, Jr. ..................... | 221/14 |
| 2,911,088 A | * | 11/1959 | Ingham, Jr. et al. ........ | 198/389 |
| 3,040,868 A | * | 6/1962 | Waters ........................ | 198/389 |
| 3,054,170 A | * | 9/1962 | Benichasa et al. ............ | 29/810 |
| 4,122,975 A | * | 10/1978 | Lowery et al. ............. | 221/173 |
| 4,223,778 A | | 9/1980 | Kontz | |
| 4,224,459 A | * | 9/1980 | Froberg ....................... | 373/41 |
| 4,418,482 A | * | 12/1983 | Aidlin et al. ................. | 34/435 |
| 5,186,307 A | * | 2/1993 | Doudement et al. ........ | 198/454 |

FOREIGN PATENT DOCUMENTS

EP          0 511 048 A     10/1992

* cited by examiner

Primary Examiner—Eileen D. Lillis
Assistant Examiner—Mark A. Deuble
(74) Attorney, Agent, or Firm—Sughrue Mion PLLC

(57) ABSTRACT

A system for supplying preforms, of the type including a hopper inclined relative to the horizontal and at the bottom of which are arranged two substantially parallel rollers driven in rotation about their respective axis, and wherein the preforms are delivered in bulk at the upper end of the hopper. The hopper includes at least a wheel for ejecting wrongly oriented preforms which is driven in rotation about its axis, which is inclined relative to a perpendicular to the direction of axes of the aligning rollers so as to sweep the wrongly aligned or nested preforms and to eject them directly towards a lateral discharge orifice of the hopper.

9 Claims, 4 Drawing Sheets

SYSTEM FOR SUPPLYING PREFORMS IN PARTICULAR FOR A CONTAINER BLOWING MACHINE

The invention relates to systems for unscrambling and aligning pre-forms, such systems for example being intended for feeding preforms to machines for blow-molding containers.

The system will be described in more detail within the scope of its implementation in a facility for blow molding containers made of polyethylene terephtalate (PET).

According to a known technique, such containers are produced in two steps. In a first step, a PET preform is molded by injection. This preform has an appreciably tubular body that is closed at one of its axial ends. Its other end is given the final shape of the container's neck during the injection molding operation. In general, the neck of the container is threaded, and at its base there is a small ring-shaped support collar extending radially outward.

There are machines in which the preforms, once injected, are directly sent toward the blow-molding machine. These preforms are transported positively, that is, each preform is picked up individually.

However, in many cases the preforms are manufactured by injection at a first location and are blow-molded to the final shape of the container at a second location on a specific blow-molding machine. Such technology allows the blow-molding operation to be performed as close as possible to the bottling location, while the injection operation can take place at any location. Indeed, it is relatively easy and inexpensive to transport the preforms, while transporting the containers after blow-molding has the disadvantage of being economically not very cost effective because of the large size of the containers.

In a case where the injection machine and the blow-molding machine are two completely independent machines, the blow-molding machine has a system for unscrambling and aligning the preforms of the type illustrated in FIG. 1.

In such a system, the preforms are dumped in bulk into a bin. They are removed from this bin by a feed elevator which in turn drops the preforms at a pre-established rate into the upper end of an alignment trough. This alignment trough generally has two alignment rollers that are inclined with reference to the horizontal and which are appreciably parallel to each other. The two rollers are driven in rotation in opposite directions, and are separated from each other in such a way as to leave an interval along and between the two rollers that is slightly larger in dimension than the dimension of the body of the preforms. However, the separation of the two alignment rollers is such that the transverse space between the two rollers is smaller than the dimension of the support collar situated at the base of the neck.

The trough is configured so that, under the effect of gravity, the preforms are forced toward the bottom of the trough where the two rollers are located. Thus, simply by gravity each preform tends to be placed in the trough, between the two rollers, so as to be supported by its collar on the rollers while the body hangs down between the two rollers. The rotational movement of the rollers and their incline on the one hand ensures the placement of the preforms one after the other in the preferential position described above, and on the other hand the sliding of the preforms along the axis of the rollers down the feed trough where they are picked up in a feed rail that is connected to the blow-molding machine. In the feed rail, the preforms gather in a continuous line.

However, because the preforms are dumped in bulk into the trough, and because of the random nature of the placement of the preforms, some of them arrive at the bottom of the trough without having been properly positioned between the two rollers. Of course, these preforms can not be placed in the feed rail that leads to the machine. This is also true for preforms that are nested in each other, even when the lower preform is properly oriented.

According to the prior art, the feed trough has, close to its lower end, a pusher wheel furnished with blades. This wheel is rotary around an axis perpendicular to the axis of the alignment wheels and the blades of this pusher wheel are intended to sweep the space of the trough situated above the rollers so as to push upstream any preform that is not correctly positioned between the rollers. The principle of this pusher wheel is that statistically the preforms become properly positioned after a certain number of pushes.

Evacuation orifices can also be provided, which, in the event of overflow of improperly arranged preforms, allow the preforms to be evacuated either to a recovery bin or directly to the first storage trough.

Such systems are currently used and in many cases are entirely satisfactory.

However, when the feeding of very high-speed machines is concerned, such as machines capable of blow molding more than 40,000 containers per hour, the usual unscrambling and alignment systems often malfunction, particularly when the preforms have a large diameter neck. In this case, because of the transport speed of the preforms in the feed trough, the preforms pushed upstream by the pusher wheel never become properly positioned between the rollers, which ends up causing jams that can lead to a stoppage of the feed of the preforms, and therefore a shutdown of the blow-molding machine because of the lack of preforms.

Of course, such shutdowns are not desirable because they can cause the shutdown of the bottling line located downstream from the blow-molding machine.

A purpose of the invention, therefore, is to propose a new design of the preform feed device that makes these systems reliable, particularly in the case of systems intended for high-speed machines.

To this end, therefore, the invention proposes a feed system for preforms having a body and a neck that has a larger diameter than the body of the preform, of the type comprising an unscrambling and alignment trough that is inclined with reference to the horizontal at the bottom of which there are two parallel alignment rollers driven in rotation around their respective axis, of the type in which the alignment rollers are separated from each other by a distance that is greater than the diameter of the body but less than the diameter of the neck of the preforms, so that by gravity the preforms can be vertically oriented with the neck up, the neck being supported on the alignment rollers and the body hanging in the space between the two rollers, and of the type in which the preforms are dumped in bulk at the upper end of the trough and are recovered at the lower end of the trough once they are aligned and oriented between the two rollers, characterized in that the trough comprises at least a wheel for ejection of the improperly oriented preforms, which wheel is driven in rotation around its axis, which is inclined with reference to a perpendicular to the direction of the axes of the alignment rollers so as to sweep the improperly aligned or nested preforms and eject them directly toward a side evacuation orifice of the trough.

According to other characteristics of the invention:

the ejection wheel sweeps a space of the trough located above the rollers so as not to come into contact with the properly aligned and oriented preforms between the alignment wheels;

the ejection wheel has flexible radial elements that are intended to come into contact with misaligned or nested preforms;

the flexible radial elements are radial blades made of flexible material;

the flexible radial elements are filaments;

the axis of the ejection wheel is arranged so as to form an angle appreciably between 20° and 75° with reference to the perpendicular to the direction of the axes of the alignment rollers;

the ejection wheel extends over a length so that it sweeps transversely appreciably the full width covered by the two rollers;

the axis of the ejection wheel is arranged so as to form an angle appreciably equal to 90° with reference to the perpendicular to the direction of the axes of the alignment rollers;

the system comprises two ejection wheels that are axially offset from each other in the direction of the axes of the rollers;

the trough comprises two side ejection orifices each of which is associated with one of the wheels;

the axes of the two wheels are appreciably parallel and are transversely offset from each other;

the system comprises means of adjusting the height of the ejection wheel;

the system comprises a storage bin from which the preforms are removed to be dumped into the trough, and the side evacuation orifice of the trough is connected to the storage bin by a device for recycling the preforms that returns the ejected preforms to the storage bin.

Other characteristics and advantages of the invention will appear from the following detailed description, as well as from the drawings in which.

Figure 1:
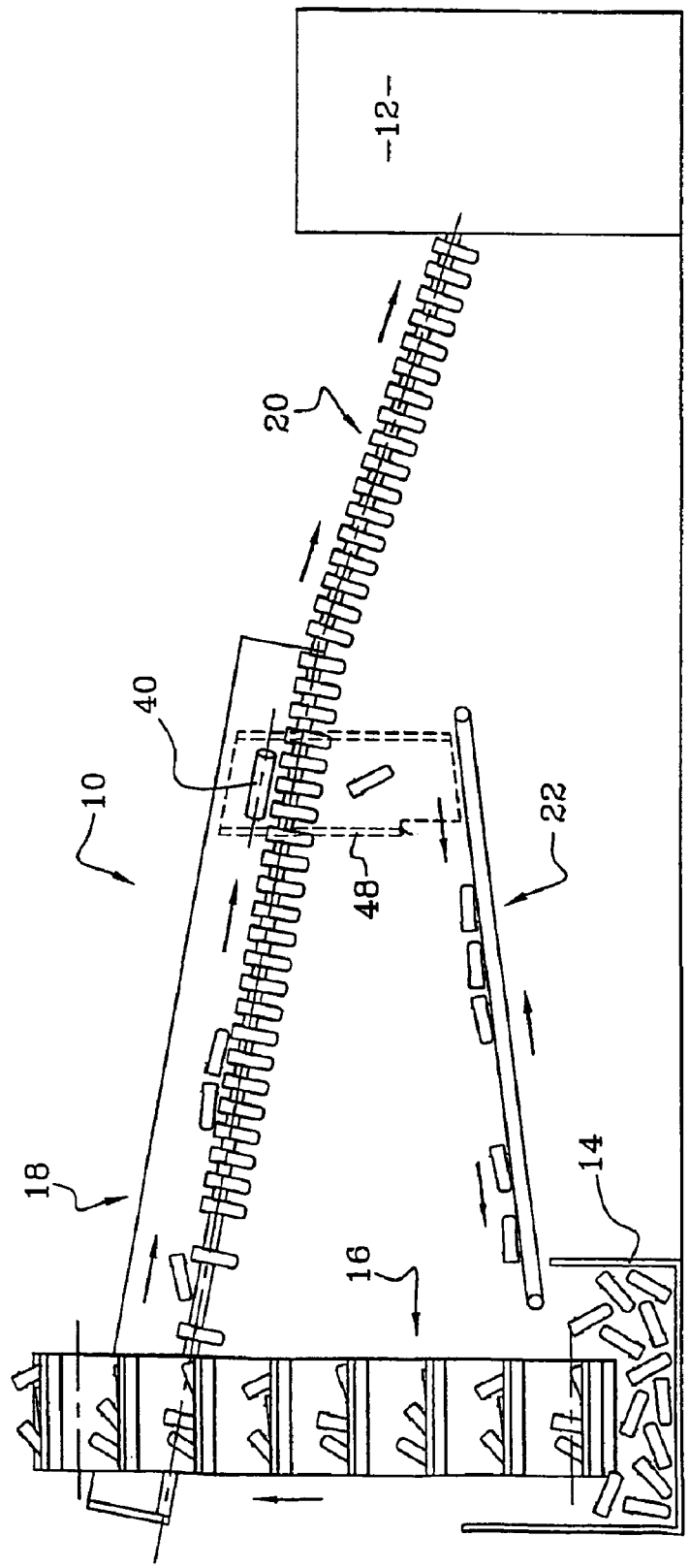
FIG. 1 is a diagrammatic side view of an unscrambling system according to the features of the invention.

Illustrated in FIG. 1 in a very diagrammatical way is a preform feed system 10 intended, for example, to feed preforms to a blow-molding machine 12. Firstly, the feed system comprises a storage bin 14 in which the preforms are stored in bulk. A lift 16 allows the preforms to be removed from the storage bin 14 and dumped onto the upper end of a feed trough 18. In the trough 18, the preforms are oriented neck upwards and are aligned in a column so as to be delivered to a feed rail 20 that transports the preforms to the blow-molding machine 12.

A recycling conveyor 22 allows the preforms to be recovered that are ejected from a side orifice 24 placed close to the lower end of the trough 18 in order to return the ejected preforms to the storage bin 14.

Figure 2:
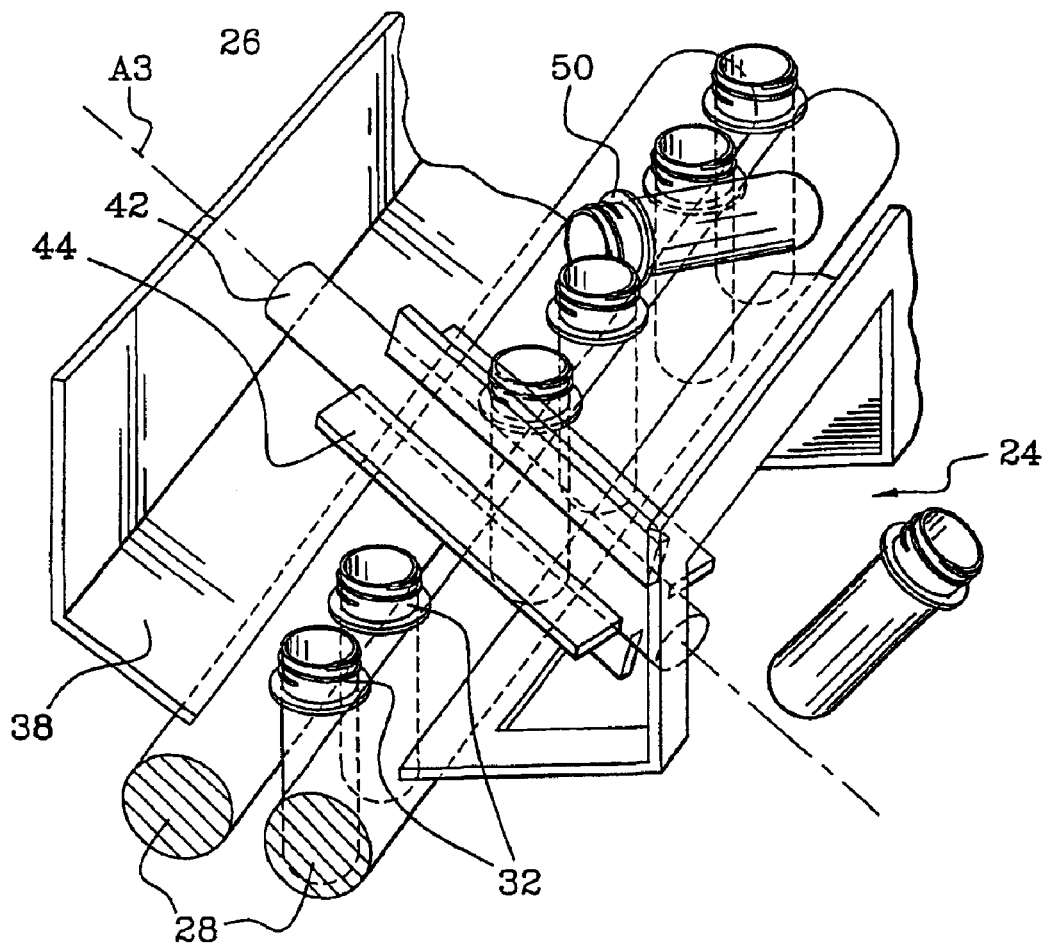
FIG. 2 is a diagrammatic view in perspective illustrating more particularly a first form of embodiment of an unscrambling trough furnished with the ejection wheel according to the invention.
Figure 3:
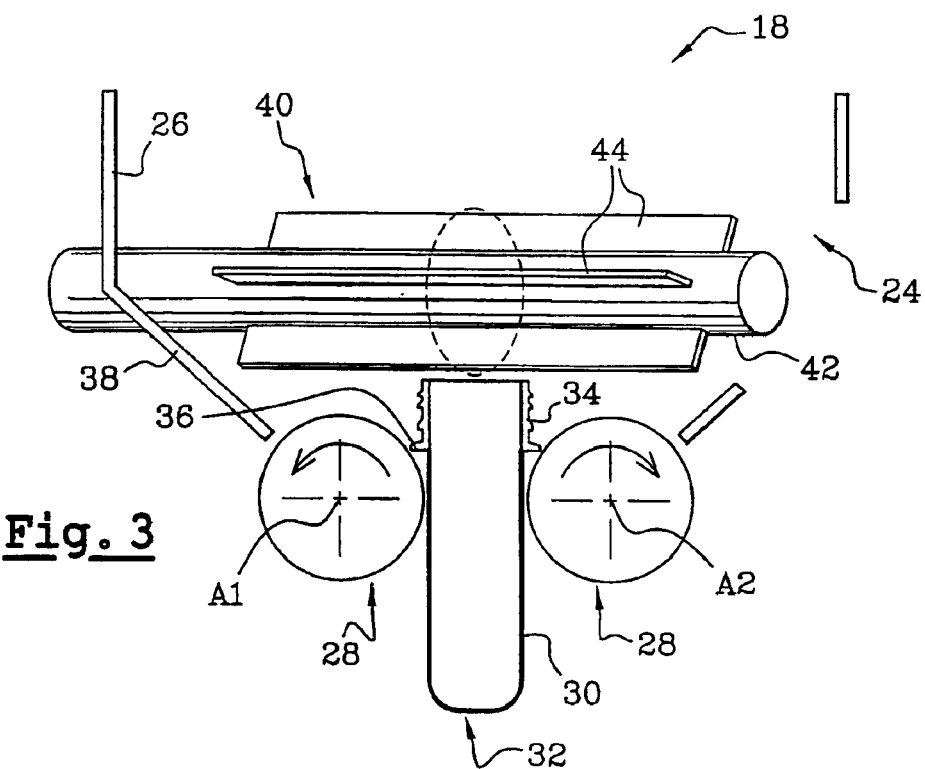
FIG. 3 is a diagrammatic view in cross section of the unscrambling trough of FIG. 2.
Figure 4:
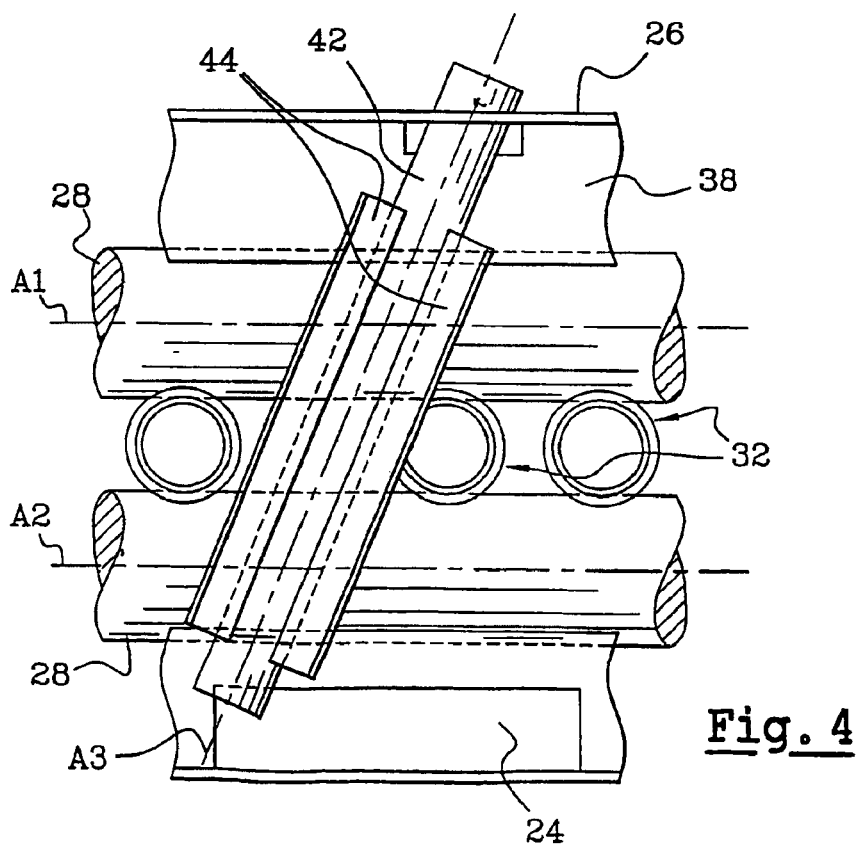
FIG. 4 is a top view of the ejection wheel of FIG. 2.

A first form of embodiment of a feed trough 18 according to the invention is represented in portions in FIGS. 2 to 4. In a known way, this trough 18 is composed of a housing comprising for example two vertical side walls 26. The bottom of the housing is formed by two rollers 28 with appreciably parallel axes A1 and A2 that extend appreciably the full length of the housing. The axes A1 and A2 are inclined with reference to the horizontal with a slope corresponding to the slope of inclination of the feed trough. These two axes A1 and A2 can be adjusted so that there are a few minutes of angle or a few degrees of angle between them.

Figure 5:
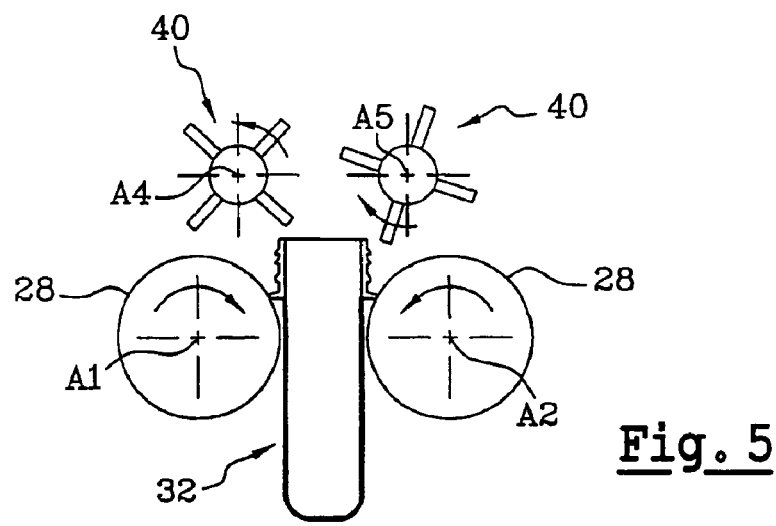
FIGS. 5 and 6 are similar views to those of FIGS. 3 and 4, illustrating a second form of embodiment of the invention.

As can be seen in FIGS. 3 and 5, the two rollers 28 are separated from each other in order to allow a space between them the transverse dimension of which is slightly greater than the diameter of the body 30 of the preform 32. However, it can also be seen that the preform 32 has a neck 34 at the base of which there is a small external radial collar 36 the diameter of which is larger than the transverse dimension of the space separating the two rollers 28. In this way, when a preform arrives on the rollers 28, its body 30 can drop into the space between the two rollers 28 but it is then held by the collar 26 in a vertical position with the neck up. In order to promote the proper positioning of the preform 32, each roller 28 is driven in a rotational movement around its respective axis A1 or A2. The two rollers turn in opposite directions from each other, that is, in the direction indicated in the figures.

In order to ensure that all of the preforms dumped into the trough come into contact with the rollers 28, it can be seen that the lower part of the side walls 26 of the housing is formed by sloping panels 38 that lead all of the preforms toward the center of the trough, on to the rollers 28.

According to the features of the invention, and as illustrated in FIG. 1, the feed trough 18 is equipped with an ejection wheel 40 that makes it possible to evacuate preforms that, upon arriving near the lower end of the trough 18, are not oriented and aligned between the two rollers.

According to the invention, this ejection wheel 40 comprises essentially a central shaft 42 that extends in a plane parallel to the plane defined by the two axes A1 and A2 of the two alignment rollers 28, vertically above this plane. According to an essential characteristic of the invention, the axis A3 of the central shaft 42 of the ejection wheel 40 is inclined with reference to a perpendicular to the direction of the axes A1 and A2. In the form of embodiment of FIGS. 2 to 4, this slope is on the order of 45°, but depending on the speed of travel of the preforms in the trough, that is, depending on the geometry and the system's rate of feed, this angle may vary, for example between 20° and 75°. In the form of embodiment of FIGS. 5 and 6, which will be described in more detail below, the trough comprises two ejection wheels 24 the respective axes A4 and A5 of which form an angle of approximately 90° with the perpendiculars to the axes A1 and A2, so that the axes A4 and A5 are appreciably parallel to the axes A1 and A2.

In the form of embodiment of FIGS. 2 to 4, the shaft 42 is connected to a system (not shown) of rotational drive around its axis A3 which drives it at a speed of about 250 RPM, for example. This drive system can be an independent motor, but it can also be provided that the ejection wheel be driven by the alignment rollers by means of a transmission device, such as a belt device.

The shaft 42 is provided with radial blades 44, which in this instance are four in number regularly distributed angularly around the axis A3, and which are made, for example, of a flexible elastomer material. The blades 44 extend along the axis A3 in such a way as to sweep, when the ejection wheel 40 is driven in rotation around its axis A3, appreciably all of the transverse space above the rollers 28 in the trough 18. The blades could be replaced by flexible radial filaments, the ejection wheel then taking the form of a rotary brush.

Facing the ejection wheel 40, the feed trough 18 has at least a lateral orifice 24 placed at the height of the ejection wheel, upstream therefrom with reference to the direction of flow of the preforms. The longitudinal dimension of the ejection orifice 24 will be selected as a function of the angle formed between the axis A3 and the direction of the axes A1 and A2, in order to ensure that a preform ejected by the wheel 40 is ejected direction toward the orifice 24. As can be seen in FIG. 1, the evacuation orifice 24 is associated with an evacuation guide 48 that allows the ejected preforms to fall onto the recycling conveyor 22.

The vertical position of the wheel 40 and the radial dimension of the blades 44 are selected so that the wheel 40, driven in rotation around its axis A3, sweeps the space immediately above the rollers 28 without coming into contact with preforms that are correctly oriented between the two rollers 28. Thus it can be seen in FIG. 3 that the neck 34 of a correctly oriented preform passes beneath the ejection wheel 40 without being touched by it. On the contrary, FIG. 2 shows that an incorrectly oriented preform 50, for example lying horizontally on the two rollers and descending with the stream of correctly oriented preforms, will inevitably be swept off by the ejection wheel 40 and thrown directly toward the side evacuation orifice 24. Of course, a device (not shown) could be provided to adjust the vertical position of the rollers 28 to adapt this position to the geometry of the preforms.

Figure 6:
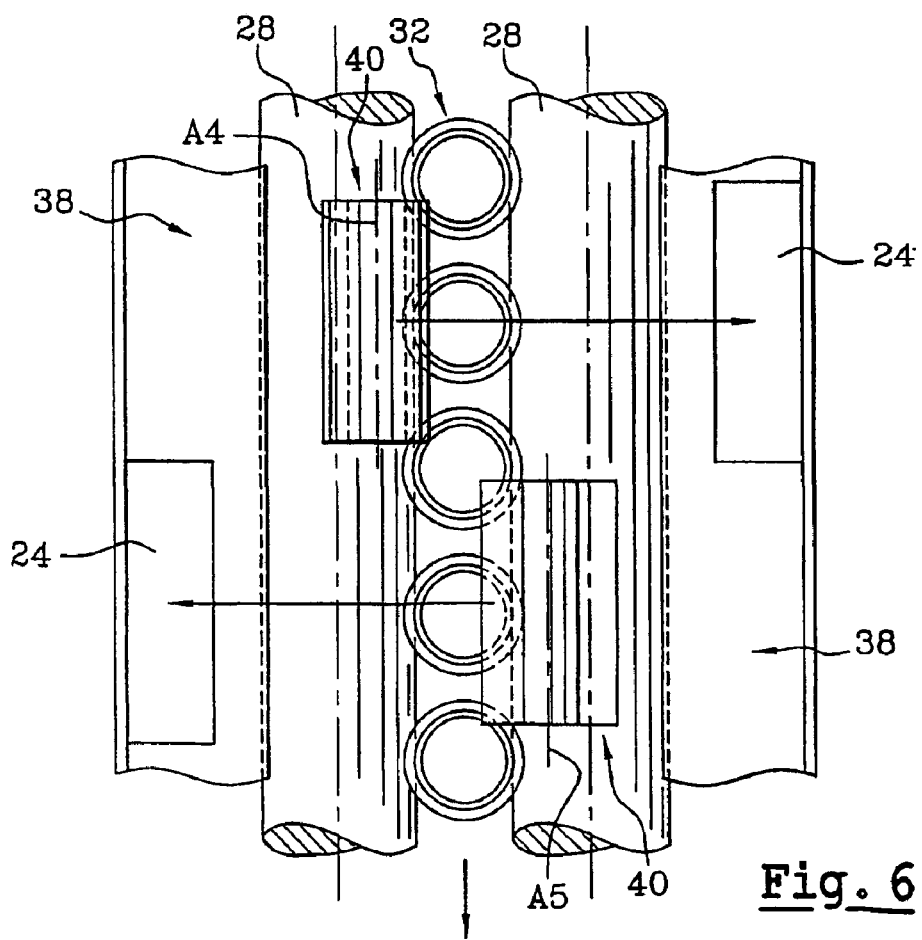

In the form of embodiment illustrated in FIGS. 5 and 6, the feed trough 18 has two ejection wheels 40 the axes A4 and A5 of which are appreciably parallel to the direction of the axes A1 and A2 of the rollers 28. As can be seen in FIG. 6, the two ejection wheels 40 are axially offset along the direction of the rollers 28. One of the wheels is upstream of the other. In this case, the trough 18 has two side ejection orifices 24, which of course will preferably be associated with a system for recycling the preforms. Each of the ejection openings 24 is placed facing the associated ejection wheel.

In this form of embodiment, the axes A4 and A5 are parallel but do not merge, so that the two ejection wheel 40 are offset transversely with respect to each other. Indeed, it can be seen that one of the wheels 40 is associated with one of the rollers 28 because it is situated appreciably above this roller, while the other ejection wheel 24 is associated with the second roller 28 by being situated appreciably above this second roller. In the example illustrated, the axis of the ejection wheels is not directly over the axis of the associated roller 28, but rather it was decided to slightly offset this axis transversely toward the other roller 28 so that the ejection wheel 40 partly overlaps the free space between the two rollers 28.

As a result of this arrangement, and due to the direction of rotation of each of the ejection wheels 40, preforms that are supported on one or the other of the rollers, without being correctly positioned in the space provided for that purpose, are ejected directly by the ejection wheel 40 toward the side ejection orifice 24. The direction of rotation of the wheels is such that each wheel 40 ejects the preforms toward the associated orifice 24 that is placed on the other side of a median plane of the trough. The preforms are therefore ejected over the top of the other roller.

Of course, the diameter of the ejection wheels 40 and the exact position of the axes A4 and A5 with reference to the axes A1 and A2 may vary, depending on the shape of the preform.

This second form of embodiment of the invention is particularly suited to preforms having a neck of wide diameter and relatively short length.

Contrary to the prior art, by directly ejecting all improperly oriented preforms, the ejection wheel 40 makes it possible to prevent an accumulation of improperly oriented preforms in the trough 18, which accumulations cause numerous jams in high speed feeders.

What is claimed is:

1. Feed system for preforms comprising:

an unscrambling and alignment trough (18) that is inclined with reference to the horizontal;

a pair of appreciably parallel alignment rollers (28) located at a bottom of the trough and driven in rotation around their respective axis (A1, A2), the preforms (32) being dumped in bulk at the upper end of the trough (18) and recovered at the lower end of the trough once they are aligned and oriented between the two rollers (28), wherein the trough (18) comprises at least a wheel (40) for ejection of the improperly oriented preforms (50), which wheel is driven in rotation around its axis (A3, A4, A5), which is not parallel or perpendicular to the direction of the axes (A1, A2) of the alignment rollers so as to sweep the improperly aligned or nested preforms (50) and eject them directly toward a side evacuation orifice (24) of the trough (18), wherein the axis of the wheel lies in a plane parallel to the plane defined by the axes (A1, A2) of the alignment rollers, and wherein the wheel is located above and facing the alignment rollers.

2. System according to claim 1, characterized in that the ejection wheel (40) sweeps a space of the trough located above the rollers (28) so as not to come into contact with the properly aligned and oriented preforms between the alignment wheels (28).

3. System according to claim 1, characterized in that the ejection wheel (40) has flexible radial elements that are intended to come into contact with misaligned or nested preforms (50).

4. System according to claim 3, characterized in that the flexible radial elements are radial blades (44) made of flexible material.

5. System according to claim 3, characterized in that the flexible radial elements are filaments.

6. System according to claim 1, characterized in that the axis (A3) of the ejection wheel (40) is arranged so as to form an angle appreciably between 20° and 75° with reference to the perpendicular to the direction of the axes (A1, A2) of the alignment rollers (28).

7. System according to claim 6, characterized in that the ejection wheel (40) extends over a length so that it sweeps transversely appreciably the full width covered by the two rollers (28).

8. System according to claim 1, characterized in that it comprises means of adjusting the height of the ejection wheel (40).

9. System according to claim 1, characterized in that it comprises a storage bin (14) from which the preforms are removed to be dumped into the trough (18), and in that the side evacuation orifice (24) of the trough (18) is connected to the storage bin (14) by a device (22, 48) for recycling the preforms that returns the ejected preforms (50) to the storage bin (14).

* * * * *